United States Patent [19]

Tsuji

[11] Patent Number: 5,367,463
[45] Date of Patent: Nov. 22, 1994

[54] VEHICLE POSITION AND AZIMUTH COMPUTING SYSTEM

[75] Inventor: Hiroaki Tsuji, Yokohama, Japan

[73] Assignee: Matsushita Electric Industrial Co., Ltd., Osaka, Japan

[21] Appl. No.: 901,211

[22] Filed: Jun. 19, 1992

[30] Foreign Application Priority Data

Jul. 15, 1991 [JP] Japan .................. 3-173623

[51] Int. Cl.$^5$ .............................................. G06F 15/50
[52] U.S. Cl. ..................... 364/449; 364/454; 364/459; 340/988; 340/995; 342/357; 342/457
[58] Field of Search ............ 364/443, 444, 449, 454, 364/455, 459; 73/178 R; 342/357, 358, 450, 451, 457; 340/988, 995

[56] References Cited

U.S. PATENT DOCUMENTS

| 4,731,613 | 3/1988 | Endo et al. | 342/357 |
| 4,903,212 | 2/1990 | Yokouchi et al. | 364/449 |
| 5,058,023 | 10/1991 | Kozikaro | 364/449 |
| 5,155,688 | 10/1992 | Tanaka et al. | 364/454 |
| 5,220,509 | 6/1993 | Takemura et al. | 364/449 |
| 5,272,483 | 12/1993 | Kato | 342/357 |

FOREIGN PATENT DOCUMENTS

| 3310111 | 9/1984 | Germany . |
| 4123097 | 1/1992 | Germany . |
| 4130367 | 3/1992 | Germany . |
| 62-298717 | 12/1987 | Japan . |
| 63-274000 | 11/1988 | Japan . |
| 2112721 | 4/1990 | Japan . |
| 2212714 | 8/1990 | Japan . |
| 3090814 | 4/1991 | Japan . |
| 3090815 | 4/1991 | Japan . |
| 3110414 | 5/1991 | Japan . |

Primary Examiner—Gary Chin
Attorney, Agent, or Firm—Stevens, Davis, Miller & Mosher

[57] ABSTRACT

An vehicle position and azimuth computing apparatus is constructed to correct both positional errors and azimuth errors caused by the accumulation of a sensor error and a map error and to provide both high positional precision and high azimuth precision. To this end, the vehicle position and azimuth computing apparatus operates to detect both an angular velocity and a moving distance of a vehicle, to compute an on-vehicle position and on-vehicle azimuth, and to detect a straight running condition of the vehicle. Then, after the GPS measurement positions during the straight running of the vehicle have been obtained, regression lines are obtained by regressing the longitudes and latitudes of the measurement positions during the straight running of the vehicle to the moving distance from the straight running starting position of the vehicle. Both a vehicle position and a vehicle azimuth are computed based on the regression lines during the straight running of the vehicle, and then an on-vehicle position and an on-vehicle azimuth, which have been computed based on the detected values of the angular velocity and the moving distance of the vehicle, are modified by using the vehicle position and azimuth obtained based on the GPS measurement data.

16 Claims, 5 Drawing Sheets

VEHICLE POSITION AND AZIMUTH COMPUTING SYSTEM

BACKGROUND OF THE INVENTION

The present invention relates to a vehicle position and azimuth computing apparatus used in a vehicle navigation system for displaying positions and azimuths of a vehicle and map information on environs of its location.

In a conventional vehicle-mounted navigation system, on-vehicle positions and azimuths are obtained by the use of a speed sensor and an angular velocity sensor, and the on-vehicle positions and azimuths thus obtained are compared with the corresponding positions and azimuths in road data contained in the map information. When a positional difference and an azimuth difference are smaller than predetermined values, respectively, a correction is made so that both the on-vehicle position and on-vehicle azimuth tally with the position and azimuth of a present vehicle position on a road in the map data.

However, there has been a problem that, for instance, when a vehicle is travelling on a new road which is not indicated on a map and so there is no chance to correct its positions and azimuth over a long travelling distance, errors contained in the computed vehicle position and azimuth values accumulate, until a driver of the vehicle would not be able to have correct information on the vehicle's position and azimuth.

To solve this problem, as described in the publications of JP-A-2-112721 (1990) and JP-A-2-212714 (1990), there has been proposed a method of correcting on-vehicle positions by the additional use of an apparatus for obtaining external information, such as a beacon positioned on a road side and a GPS (global positioning system) and thereby compute a present vehicle position. However, the information provided by the beacon or GPS contains only positional information, and therefore the vehicle azimuth cannot be corrected based on this information. Furthermore, another problem is involved in the global positioning system that precision of the position measurement is deteriorated by adverse influences of the reflection by buildings of electromagnetic waves transmitted from the satellites and of a variation of the combination of satellites used in the measurement.

SUMMARY OF THE INVENTION

An object of the present invention is to provide a vehicle position and azimuth computing apparatus capable of continuously providing a correct vehicle azimuth and a correct vehicle position.

Another object of the present invention is to provide a vehicle position and azimuth computing apparatus capable of correcting both an on-vehicle azimuth and an on-vehicle position with high precision, even when there is a difference in the combination of and in the number of satellites used in the measurement by GPS.

A further object of the present invention is to provide a vehicle position and azimuth computing apparatus capable of modifying both an on-vehicle azimuth and an on-vehicle position with high precision, even when measurement precision is deteriorated due to a combination of satellites used in the measurement by GPS.

A still further object of the present invention is to provide a vehicle position and azimuth computing apparatus in which, when a vehicle is travelling all a correct position, both a position and an azimuth of the vehicle are prevented from being erroneously modified due to incorrect positional and azimuth information.

The present invention is intended to provide a vehicle position and azimuth computing apparatus which comprises: measurement position computing means for determining a position of a vehicle by performing a measurement by the use of a GPS (global positioning system); on-vehicle position and azimuth computing means for computing both an on-vehicle position and azimuth of the vehicle based on an angular velocity and a moving distance of the vehicle; straight running detecting means for detecting a straight running condition of the vehicle based on the angular velocity; longitude line computing means for obtaining a longitude line as a regression line obtained by regressing the measurement position longitude during the straight running of the vehicle to the moving distance from the straight running starting position of the vehicle up to the measurement position; latitude line computing means for obtaining a latitude line as a regression line obtained by regressing the measurement position latitude during the straight running of the vehicle to the moving distance from the straight running starting position of the vehicle up to the measurement position; on-vehicle azimuth modifying means for computing an azimuth of the vehicle during straight running of the vehicle based on an inclination of a longitude versus latitude line during the straight running of the vehicle, which is obtained from an inclination of the longitude line and an inclination of the latitude line, thereby modifying an on-vehicle azimuth computed by the on-vehicle position and azimuth computing means; and on-vehicle position modifying means for modifying the on-vehicle position computed by the on-vehicle position and azimuth computing means on the basis of a vehicle position computed by using the longitude and latitude which are obtained by applying a moving distance, which extends from the straight running starting position up to the vehicle position, to both the longitude line and the latitude line.

Further, the present invention employs used satellite determining means which determines either the combination or the number of satellites used in the measurement by the GPS, and when either the combination or the number of the satellites used in the measurement has changed, a regression line is obtained by using a measurement position, which has been obtained after either the combination or the number of the satellites used in the measurement has changed, as a new straight-running starting position, and both the on-vehicle position and on-vehicle azimuth are modified by utilizing this regression line.

Also, the present invention employs precision deterioration rate determining means which determines a precision deterioration rate resulting from the combination of satellites used at a GPS measurement position, and when the precision deterioration rate has a value equal to or greater than a preset value, a regression line is obtained without using this measurement position, and both the on-vehicle azimuth and on-vehicle position are modified by the use of this regression line.

Furthermore, the vehicle position and azimuth computing apparatus of the present invention comprises: road data gathering means for gathering road data from road map information; on-vehicle position and azimuth correcting means for comparing an on-vehicle position and azimuth, which have been computed by the on-vehicle position and azimuth computing means, with an on-road position and azimuth, which have been gathered by the road data gathering means, at every predetermined travelling distance and for correcting the on-vehicle position and azimuth by replacing them by an on-road position and azimuth, when both a positional difference and an azimuth difference are smaller than respective values which are determined by a moving distance and a rotational angle measured from a vehicle position where a preceding correction has been made; and correction times recording means for recording the number of times of corrections which have been made within a latest predetermined travelling distance. With this structure, the modification of the on-vehicle position and azimuth is not performed when the number of times of corrections recorded by the correction times recording means is below a preset value.

Thus, in accordance with the present invention, a regression line of the longitude and latitude is obtained based on the vehicle position information obtained by the GPS, an accurate vehicle azimuth is obtained from an inclination-of a longitude versus latitude line obtained from the regression line, and an accurate vehicle position is obtained by applying a moving distance, which extends from the straight running starting position up to the present measurement position, to the regression line.

Further, according to the present invention, when either the combination or the number of the satellites used in the measurement by the GPS changes, a regression line is obtained by using a measurement position, where either the combination or the number of satellites used in the measurement by the GPS has changed, as a straight running starting position, and both an on-vehicle position and an on-vehicle azimuth can be modified with high precision by utilizing the regression line.

Further, the present invention employs the precision deterioration rate determining means for determining a precision deterioration rate resulting from the combination of satellites used in the measurement by the GPS, and, when the precision deterioration rate is equal to or higher than a predetermined value, a regression line is obtained without using the measurement position at this time, and the modification of an on-vehicle azimuth and on-vehicle position to impart higher precision can be performed by using the regression line thus obtained.

Moreover, according to the present invention, road data are gathered from the road map information; at every predetermined travelling distance, a comparison is made between an on-vehicle position and azimuth computed by the on-vehicle position and azimuth computing means and an on-road position and azimuth, respectively; when differences in position and azimuth are lower than respective values determined by a moving distance and a rotational angle which are measured from a measurement position where a preceding correction has been made, the on-vehicle position and azimuth are corrected by being replaced by the on-road position and azimuth; and, when the number of times of corrections made within a latest predetermined travelling distance is equal to or greater than a predetermined value, no modification of the on-vehicle position and on-vehicle azimuth is performed on the assumption that the vehicle is travelling at a correct position and in a correct azimuth.

DESCRIPTION OF THE PREFERRED EMBODIMENTS

Figure 1:
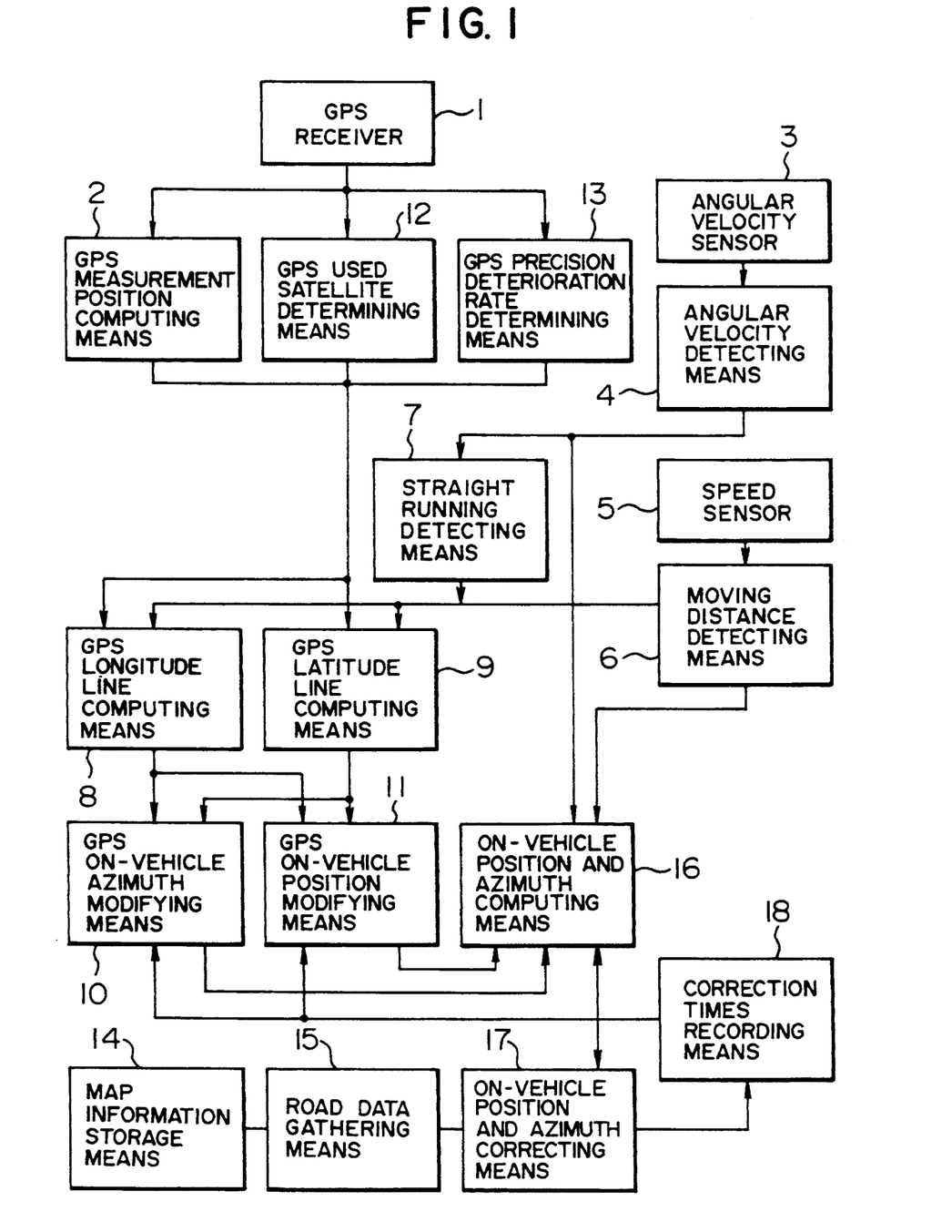
FIG. 1 is a block diagram showing a first embodiment of the present invention.

Referring to the accompanying drawings, the present invention will be described in detail. FIG. 1 is a block diagram showing a first embodiment of the present invention. In FIG. 1, reference numeral 1 indicates a GPS receiver; reference numeral 2 denotes GPS measurement position computing means; reference numeral 3 designates an angular velocity sensor; reference numeral 4 indicates angular velocity detecting means; reference numeral 5 denotes a speed sensor; reference numeral 6 denotes moving distance detecting means; reference numeral 7 denotes straight running detecting means; reference numeral 8 denotes GPS longitude line computing means; reference numeral 9 denotes GPS latitude line computing means; reference numeral 10 denotes GPS on-vehicle azimuth modifying means; reference numeral 11 denotes GPS on-vehicle position modifying means; reference numeral 12 indicates GPS used satellite determining means; reference numeral 13 denotes GPS precision deterioration rate determining means; reference numeral 14 denotes map information storage means; reference numeral 15 designates road data gathering means; reference numeral 16 denotes on-vehicle position and azimuth computing means; reference number 17 denotes on-vehicle position and azimuth correcting means; and reference numeral 18 indicates correction times recording means.

Next, an operation of the above-described first preferred embodiment will be explained. Based on an output from the angular velocity sensor 3 such as an optical fiber gyro, a vibration gyro, etc., the angular velocity detecting means 4 detects an angular velocity of a vehicle, while, based on an output from the speed sensor 5, the moving distance detecting means 6 detects a moving (travelling) distance of the vehicle.

In accordance with output values from the angular velocity detecting means 4 and the moving distance detecting means 6, the vehicle position and azimuth computing means 16 computes both an on-vehicle position and on-vehicle azimuth. Assuming that the symbol "$d\theta n$" represents an output value of the angular velocity detecting means 4; the symbol "$dLn$" represents an output value of the moving distance detecting means 6; the symbols "$Xn-1$ and $Yn-1$" denote an on-vehicle position obtained by the preceding computation; and the symbol "$\theta n-1$" indicates an on-vehicle azimuth obtained by the preceding computation, both the latest on-vehicle position "$Xn, Yn$" and the latest on-vehicle azimuth "$\theta n$" are expressed by the following equations $$\theta_n = \theta_{n-1} + d\theta_n$$

$$X_n = X_{n-1} + dL_n \times \cos\theta_n$$

$$Y_n = Y_{n-1} + dL_n \times \sin\theta_n$$

The on-vehicle position and azimuth correcting means 17 compares an on-road position and azimuth, which have been gathered by the road data gathering means 15 from the map information storage means 14 such as a CD-ROM, etc., with an on-vehicle position and azimuth, which have been computed by the on-vehicle position and azimuth computing means 16, respectively, at every predetermined travelling distance, and corrects the on-vehicle position and azimuth computed by the on-vehicle position and azimuth computing means 16 by replacing them by the on-road position and azimuth, respectively, when both differences in the position and azimuth are smaller than respective values which are determined by a moving distance and a rotational angle measured from the measurement position where the preceding correction has been made. Besides, the number of times of corrections which have been made within the latest predetermined travelling distance is recorded in the correction times recording means 18.

Figure 2:
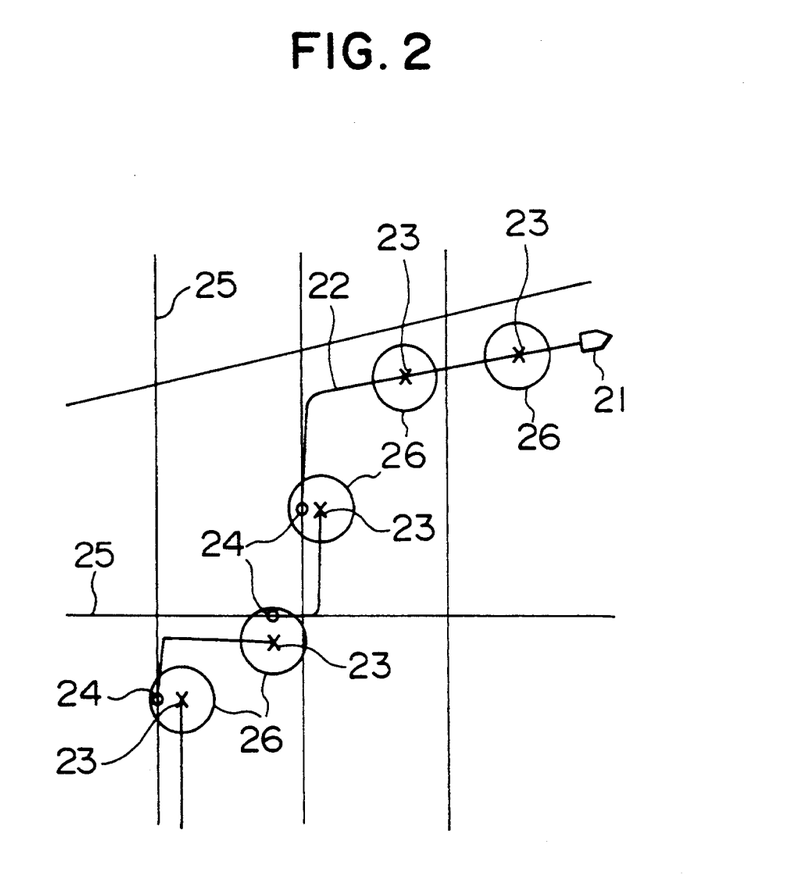
FIG. 2 is an explanatory diagram illustrating an example of an on-vehicle position correcting operation in the first embodiment.

In FIG. 2, there are shown: a travelling locus 22 of a vehicle 21; positional points 23 where the on-vehicle position and azimuth correcting means 17 has attempted to make corrections; positional points 24 where corrections have been made by comparing the on-vehicle positions and azimuths with the on-road positions and azimuths gathered by the road data gathering means 15; road data 25 gathered by the road data gathering means 15; and ranges 26 where respective differences between the on-road position and the on-vehicle position and between the on-road azimuth and the on-vehicle azimuth are smaller than the above-described determined values, respectively.

Next, the straight running detecting means 7 detects whether the vehicle is travelling on a straight road or not. A straight running condition of the vehicle is decided to be the case if an integral value of the angular velocity obtained by the angular velocity detecting means 4 from the straight running starting position is equal to or smaller than a predetermined value and further an integral value of angular velocities detected within another shorter travelling section, which is separately determined, is equal to or smaller than another predetermined value.

While the vehicle is running straightly, firstly data sent from the GPS receiver 1 are analyzed, and a reception position, where the GPS receiver 1 has received the data (this reception position is a measurement position, namely, a position where the GPS has decided that the receiver is present, but this reception position may be different from a position where the vehicle is actually travelling), is utilized by the GPS measurement position computing means 2 to compute a longitude and a latitude of the reception position; both the combination and the number of satellites used in this measurement are determined by the GPS used satellite determining means 12; and then the deterioration rate of the measurement position determining precision, such as HDOP (Horizontal Dilution of Precision) or the like, estimated by the actual GPS satellite arrangement is determined by the GPS precision deterioration rate determining means 13.

Every time a measurement position is computed by the GPS measurement position computing means 2, the GPS longitude line computing means 8 computes the following items (a) to (d).

(a) an integral value of the longitudes from the longitude of the straight running starting position of the vehicle up to the longitude of each measurement position.

(b) an integral value of the moving distances from the straight running starting position of the vehicle up to each measurement position.

(c) An integral value of the values each of which is obtained by multiplying (the longitude at each measurement position) by (the moving distance from the straight running starting position up to each measurement position).

(d) An integral value of the values each of which is obtained by squaring the moving distance from the straight running starting position of the vehicle up to each measurement position.

Similarly, the GPS latitude line computing means 9 computes the following items (e) to (f).

(e) An integral value of the latitudes from the latitude of the straight running starting position of the vehicle up to the latitude of each measurement position.

(f) An integral value of the moving distances from the straight running starting position of the vehicle up to each measurement position.

(g) An integral value of the values each of which is obtained by multiplying (the latitude at each measurement position) by (the moving distance from the straight running starting position up to each measurement position).

(h) An integral value of the values each of which is obtained by squaring the moving distance from the straight running starting position of the vehicle up to each measurement position.

Here, it should be noted that, when the precision deterioration rate determined by the GPS precision deterioration rate determining means 13 is equal to or higher than a predetermined value (namely, the position determining precision is deteriorated), this measurement position is not used in the computation of the above-mentioned integral values.

Also, when a difference between a straight distance between a first position, which is computed based on the longitude and latitude of the preceding GPS measurement position, and a second position, which is computed base on the longitude and latitude of the present GPS measurement position, and a moving distance between the above-mentioned two positions obtained by the moving distance detecting means 6 is equal to or greater than a predetermined value, the position computed based on the longitude and latitude of the present GPS measurement position is not used in the computation of the above-mentioned integral values.

Furthermore, when a difference between a distance between a position, which is computed based on the longitude and latitude obtained by the preceding GPS measurement at the straight running starting position, and a position, which is computed based on the longitude and latitude obtained by the present GPS measurement position, and a moving distance between the above-mentioned two positions obtained by the moving distance detecting means 6 is equal to or greater than a predetermined value, this value is not used in the computation of the above-mentioned integral values, assuming that an error of the present GPS measurement position is great.

As a result, a GPS measurement, whose measurement precision is temporarily deteriorated due to reflection of electromagnetic waves, etc., is excluded, and the position and azimuth modification in the GPS system can be performed with high precision.

Figure 3:
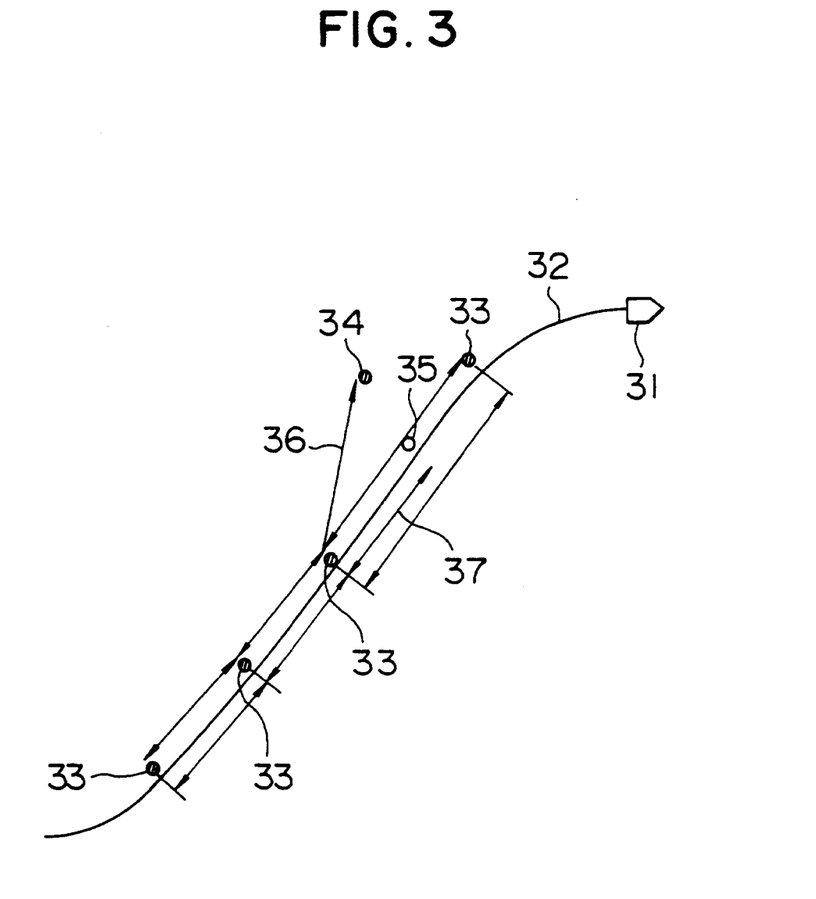
FIG. 3 is an explanatory diagram illustrating an example of exception of a measurement position in the measurement by he GPS due to deteriorated precision in the first embodiment.

In FIG. 3, there are shown a travelling locus 32 of a vehicle 31; a measurement position 33 measured by the GPS system with high precision; a measurement position 34 measured by the GPS system with deteriorated precision; a position 35 where the vehicle 31 is actually travelling, though this position corresponds to the above-described-position 34 measured by the GPS system; a distance 36 obtained based on the longitudes and latitudes of the two GPS measurement positions; and a moving distance 37 between the two GPS measurement positions obtained by the moving distance detecting means 6.

Then, when either the combination or the number of satellites used in the measurement, which satellites have been determined by the GPS used satellite determining means 12, is different from either the combination or the number of satellites used in the previous GPS measurements, respectively, and also when a predetermined number of GPS measurement positions have occurred, which GPS measurement positions have been unable to be used in the computation of the integral values in view of the above-described conditions, all of the integral values computed so far are set to zero, and the computation of integral values is restarted with this position being used as a starting position where a new measurement of the straight running of the vehicle is to be started.

As a result, since only the measurement positions, which use a selected combination of satellites, are utilized as a basis of computation, even when the measurement precision changes due to a variation in the combination of satellites used in the measurement, it is possible to prevent an error from occurring when the measurement is carried out by using a different combination of satellites, so that the position and azimuth modification by the GPS system can be carried out with high precision.

Furthermore, when the number of times of measurement by the GPS system is equal to or greater than a preset number of times, and also the moving distance from the straight running starting position is equal to or longer than a preset distance, the GPS longitude computing means 8 and the GPS latitude computing means 9 operate respectively to use the integral values of the longitudes and latitudes, which have been computed so far, thereby to obtain a regression line by regressing the longitudes of the GPS measurement positions during the straight running of the vehicle to the moving distance from the straight running starting position and a regression line by regressing the latitudes of the GPS measurement positions during the straight running of the vehicle to the moving distance from the straight running starting position. In this case, the frequency and precision of the modification of the on-vehicle position and azimuth may be optimized by varying the above-described preset number of times of the GPS measurement and the above-described preset distance from the straight running starting position.

If the respective values of the preset number of times and the preset distance are increased, the precision is elevated, while the modification frequency is decreased. Conversely, if the respective values of the preset number of times and the preset distance are decreased, the modification frequency is increased, while the precision is deteriorated.

Figure 4:
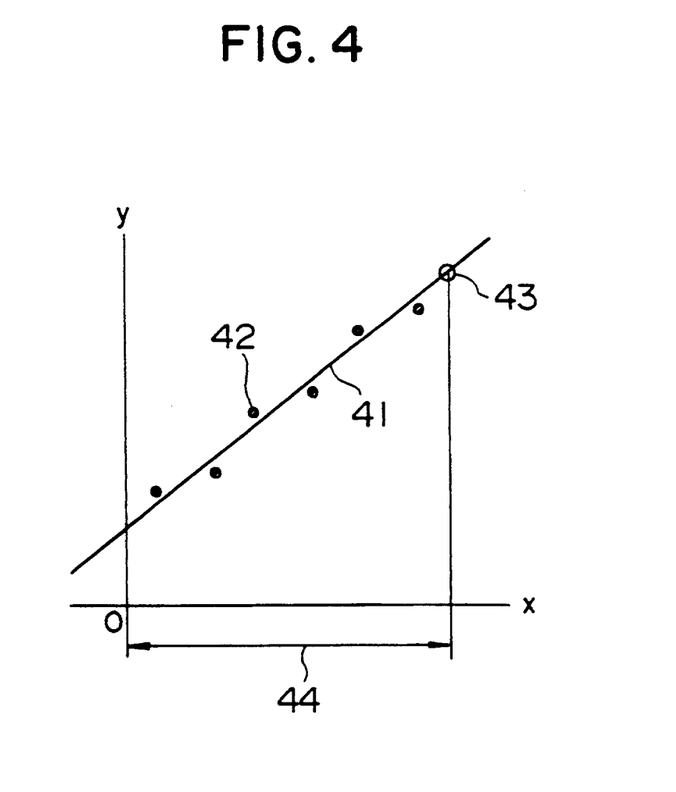
FIG. 4 is an explanatory diagram showing an example of a regression line of either a longitude or a latitude for respective measurement positions in the measurement by the GPS in the first embodiment.

Assuming that the symbol "y" indicates either the longitude or latitude, and the symbol "x" denotes a moving distance from the straight running starting position, the above-mentioned formula of the regression lines is represented by $$y = ax + b$$

where the coefficients "a" and "b" are given by the following equations (1) and (2)

$$a = \frac{n \sum_{i=1}^{n} x_i y_i - \left(\sum_{i=1}^{n} x_i\right) \cdot \left(\sum_{i=1}^{n} y_i\right)}{n \sum_{i=1}^{n} x_i^2 - \left(\sum_{i=1}^{n} x_i\right)^2} \quad (1)$$

$$b = \frac{\sum_{i=1}^{n} y_i}{n} - a \cdot \frac{\sum_{i=1}^{n} x_i}{n} \quad (2)$$

where
- n: the number of times of the GPS measurement during the straight running;
- $\Sigma y$: an integral value of either the longitude or the latitude at respective measurement positions;
- $\Sigma x$: an integral value of the moving distance from the straight running starting position;
- $\Sigma xy$: an integral value of a product of the longitude or the latitude and the moving distance from the straight running starting position; and
- $\Sigma x^2$: an integral value of a square of the moving distance from the straight running starting position.

FIG. 4 represents a regression line 41 of either the longitude or the latitude; a point 42 which indicates the relation between the moving distance from the straight running starting position of the vehicle in the GPS measurement and the longitude or the latitude; an on-vehicle position and azimuth modifying position 43; and a straight running section 44.

Thus, when each of the GPS longitude line and the GPS latitude line is obtained in the form of a regression line, the GPS on-vehicle azimuth modifying means 10 computes a vehicle azimuth during the straight running of the vehicle on the basis of an inclination of the longitude versus latitude line during the straight running of the vehicle, which inclination is obtained from an inclination of the GPS longitude line and an inclination of the GPS latitude line, and thereby modifies the on-vehicle azimuth obtained by the on-vehicle position and azimuth computing means 16. The GPS on-vehicle position modifying means 11 computes a vehicle position by applying a straight running moving distance from the straight running starting position of the vehicle up to the measurement position to the GPS longitude line and the GPS latitude line, and thereby modifies the on-vehicle position obtained by the on-vehicle position and azimuth computing means 16.

Here, if a moving distance from the straight running starting position is shorter than a predetermined value, in spite of the fact that the number of times of the GPS measurements is equal to or greater than a predetermined value, the GPS on-vehicle position correcting means 11 computes a vehicle position by applying the straight running moving distance from the straight running starting position up to the present measurement position to the GPS longitude line and the GPS latitude line, and thereby modifies the on-vehicle position obtained by the on-vehicle position and azimuth computing means 16. However, the GPS on-vehicle azimuth modifying means 10 does not perform a modification of the on-vehicle azimuth. As a result, an azimuth modification with deteriorated precision can be avoided.

When a moving distance from the straight running starting position, which moving distance has been detected by the moving distance detecting means 6, is equal to zero, in spite of the fact that the number of times of the GPS measurements is equal to or greater than a preset value, the GPS longitude line computing means 8 and the GPS latitude line computing means 9 compute respective average values of the longitudes and latitudes obtained by the GPS measurements performed at respective measurement positions, whereby a vehicle position is obtained based on the respective average values of the longitudes and latitudes, and then the GPS on-vehicle position modifying means 11 modifies an on-vehicle position computed by the on-vehicle position and azimuth computing means 16 by using the vehicle position thus obtained.

However, if the number of times of corrections recorded in the correction times recording means 18 is equal to or greater than a preset value, no modification is carried out by the GPS on-vehicle azimuth modifying means 10 and the GPS on-vehicle position modifying means 11. As a result, it can be prevented that an on-vehicle position is modified to indicate an incorrect on-road-map position due to a GPS measurement of deteriorated precision, in spite of the fact that the vehicle is travelling at a correct position on the road map.

Further, when the GPS on-vehicle azimuth modifying means 10 performs a modification of an on-vehicle azimuth, it may be possible to use:

(a) a longitude and a latitude which are obtained by applying a moving distance from the straight running starting position of the vehicle but having a zero value to the GPS longitude line and the GPS latitude line, respectively, that is, the longitude and the latitude at the straiht running starting position of the vehicle; and (b) a longitude and a latitude which are obtained by applying a moving distance from the straight running starting position of the vehicle up to the present measurement position to the GPS longitude line and the GPS latitude line, respectively, to thereby obtain a vehicle azimuth of the present measurement position as viewed from the straight running starting position.

Similarly, when a position and an azimuth of the vehicle obtained by the GPS measurement are used, as they are, to perform modifications of an on-vehicle position and an on-vehicle azimuth, respectively, no modification is carried out, if the number of times of corrections recorded in the correction times recording means 18 is equal to or greater than a preset value. As a result, it can be prevented that an on-vehicle position and an on-vehicle azimuth are modified to have incorrect values, respectively, by the use of information of deteriorated precision, in spite of the fact that the vehicle is travelling at a correct position on the road map.

As explained above, in accordance with the first preferred embodiment, even when there is no opportunity to modify the on-vehicle position and on-vehicle azimuth over a long travelling distance, it is possible to determine the vehicle position and azimuth with an elevated level of precision by utilizing the GPS system.

Figure 5:
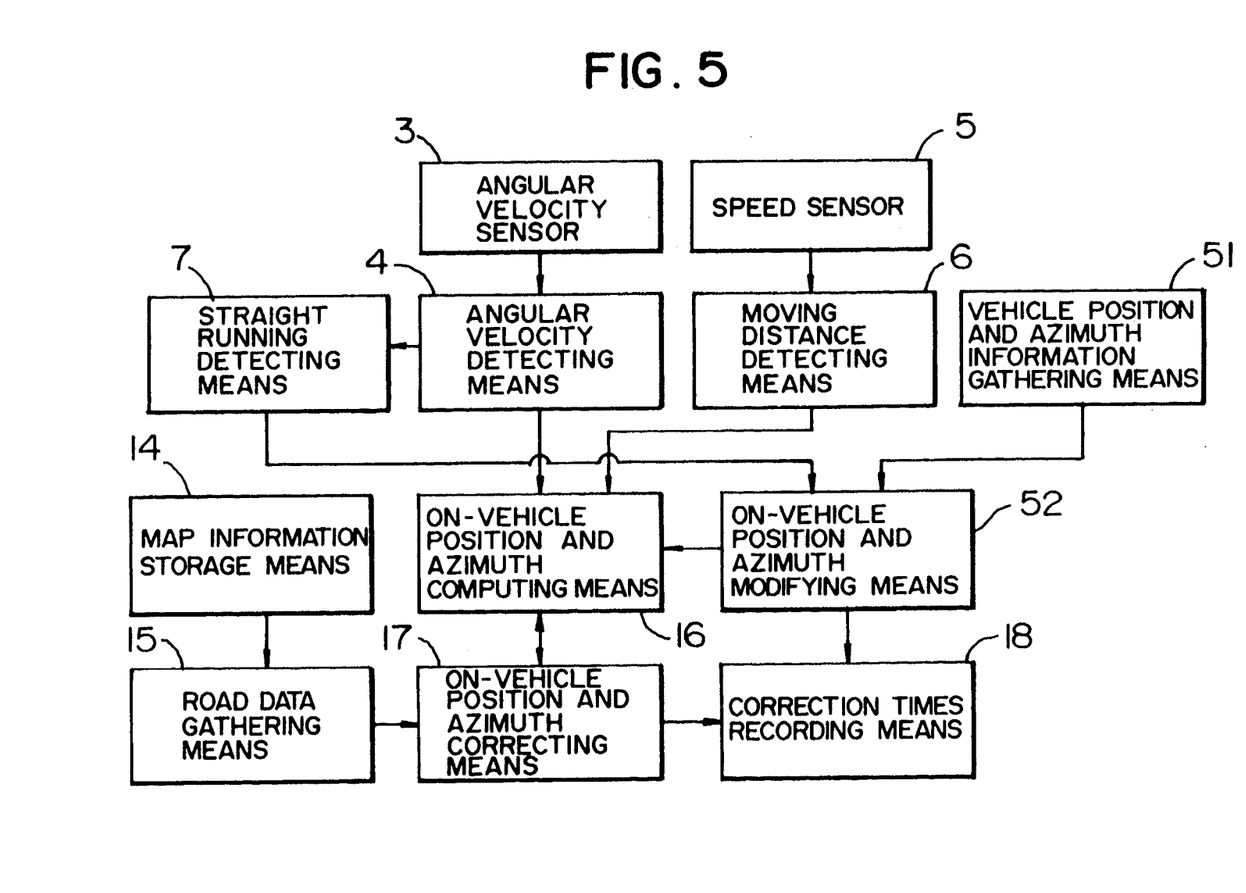
FIG. 5 is a block diagram showing a second embodiment of the present invention.

FIG. 5 is a block diagram showing a second embodiment of the present invention. In FIG. 5, reference numeral 51 denotes vehicle position and azimuth information gathering means for gatering information on positions and azimuths of a vehicle from outside of the vehicle; and reference numeral 52 indicates on-vehicle position and azimuth modifying means for modifying an on-vehicle position and an on-vehicle azimuth based on the information on the position and the azimuth of the vehicle gathered by the vehicle position and azimuth information gathering means 51 and also based on the number of times of corrections recorded in the correction times recording means 18. Since the remaining component elements of the second embodiment are similar to those of the first embodiment, an explanation thereof is omitted.

Next, a description will be made of an operation of the second embodiment. The vehicle position and azimuth computing apparatus of the second embodiment performs a similar operation by substituting the position and azimuth information of the vehicle gathered by the vehicle position and azimuth information gathering means 51 for the longitude and latitude information utilized in the first embodiment. Also, in this second embodiment, when the number of times of corrections recorded in the correction times recording means 18 is equal to or greater than a preset value, no modification is carried out based on the vehicle position information and the vehicle azimuth information gathered by the vehicle position and azimuth information gathering means 51. As a result, the second embodiment has an advantage of preventing an on-vehicle position and an on-vehicle azimuth from being modified to indicate an incorrect position and an incorrect azimuth, respectively, based on the vehicle position and azimuth information gathered from outside of the vehicle, in spite of the fact that the vehicle is travelling at a correct position on the road map.

I claim:

1. A vehicle position and azimuth computing apparatus comprising:

measurement position computing means for obtaining measurement positions of a vehicle by performing a measurement in accordance with a GPS (global positioning system);

a gyro for detecting an angular velocity of the vehicle;

a speed sensor for detecting a travel distance of the vehicle;

on-vehicle position and azimuth computing means for computing both an on-vehicle position and an on-vehicle azimuth of the vehicle based on the angular velocity and the travel distance of the vehicle;

straight running detecting means for detecting a straight running condition of the vehicle based on the angular velocity;

longitude line computing means for obtaining a longitude line as a first regression line obtained by regressing longitudes of the measurement positions during the straight running of the vehicle to the moving distance from a starting position of the straight running of the vehicle;

latitude line computing means for obtaining a latitude line as a second regression line obtained by regressing latitudes of the measurement positions during the straight running of the vehicle to the moving distance from the starting position of the straight running of the vehicle;

on-vehicle azimuth modifying means for computing an azimuth of the vehicle during the straight running condition of the vehicle based on an inclination of a longitude line versus latitude line during the straight running condition of the vehicle, which is obtained from an inclination of the longitude line and an inclination of the latitude line, and modifying the on-vehicle azimuth computed by said on-vehicle position and azimuth computing means in response thereto; and on-vehicle position modifying means for modifying the on-vehicle position computed by said on-vehicle position and azimuth computing means on the basis of a vehicle position computed by using a longitude and a latitude which are obtained by applying a travel distance, which extends from the straight running starting position to a vehicle position, to both the longitude line and the latitude line.

2. A vehicle position and azimuth computing apparatus as claimed in claim 1, wherein, when the number of GPS measurements during the straight running condition of the vehicle is equal to or greater than a predetermined value;

said on-vehicle azimuth modifying means modifies the on-vehicle azimuth by the use of the first and second regression lines; and said on-vehicle position modifying means modifies the on-vehicle position by the use of the first and second regression lines.

3. A vehicle position and azimuth computing apparatus as claimed in claim 1, wherein, when the travel distance during the straight running condition of the vehicle is equal to or longer than a predetermined length:

said on-vehicle azimuth modifying means modifies the on-vehicle azimuth by the use of the first and second regression lines; and said on-vehicle position modifying means modifies the on-vehicle position by the use of the first and second regression lines.

4. A vehicle position and azimuth computing apparatus as claimed in claim 1, wherein, when the number of GPS measurements during the straight running condition of the vehicle is equal to or greater than a predetermined value and when the travel distance during the straight running condition of the vehicle is equal to or longer than a predetermined length:

said on-vehicle azimuth modifying means modifies the on-vehicle azimuth by the use of the first and second regression lines; and said on-vehicle position modifying means modifies the on-vehicle position by the use of the first and second regression lines.

5. A vehicle position and azimuth computing apparatus as claimed in claim 1, wherein, when the number of GPS measurements during the straight running condition of the vehicle is equal to or greater than a predetermined value and when the travel distance during the straight running condition of the vehicle is shorter than a predetermined length, said on-vehicle position modifying means is constructed to modify the on-vehicle position by the use of the first and second regression lines; and said on-vehicle azimuth modifying means is constructed to be inhibited from modifying the on-vehicle azimuth.

6. A vehicle position and azimuth computing apparatus as claimed in claim 1, wherein, when the number of the GPS measurements is equal to or greater than a predetermined value and when the travel distance of the vehicle is zero, said longitude line computing means is constructed to obtain an average value of the longitudes of respective measurement positions of the GPS measurements; and said latitude line computing means is constructed to obtain an average value of the latitudes of the respective measurement positions of the GPS measurements, whereby a position obtained by the use of the average values of the longitudes and the latitudes, respectively, is used to modify the on-vehicle position.

7. A vehicle position and azimuth computing apparatus as claimed in claim 1, further comprising:

satellite number determining means for gathering information on the number of satellites used in the GPS measurement;

wherein, when the number of satellites used in the GPS measurement has changed, said longitude line computing means and said latitude line computing means obtain said first regression line and said second regression line, respectively, by assuming a measurement position, where the number of satellites used in the GPS measurement has changed, as the starting position of the straight running condition of the vehicle;

said on-vehicle azimuth modifying means modifies the on-vehicle azimuth by the use of the first and second regression lines; and said on-vehicle position modifying means modifies the on-vehicle position by the use of the first and second regression lines.

8. A vehicle position and azimuth computing apparatus as claimed in claim 1, further comprising:

satellite number determining means for gathering information on the combination of satellites used in the GPS measurement;

wherein, when the combination of satellites used in the GPS measurement has changed, said longitude line computing means and said latitude line computing means obtain said first regression line and said second regression line, respectively, by assuming a measurement position, where the combination of satellites used in the GPS measurement has changed, as the starting position of the straight running condition of the vehicle;

said on-vehicle azimuth modifying means modifies the on-vehicle azimuth by the use of the first and second regression lines; and said on-vehicle position modifying means modifies the on-vehicle position by the use of the first and second regression lines.

9. A vehicle position and azimuth computing apparatus as claimed in claim 1, wherein, when a difference between a distance between two different measurement positions, which distance is computed by the use of the longitudes and latitudes of the respective two measurement positions, and a travel distance between the two measurement positions, which travel distance is detected by said speed sensor, is equal to or greater than a predetermined value:

said longitude line computing means and said latitude line computing means obtain said first regression line and said second regression line, respectively, without using the measurement position of the latter GPS measurement in the two measurement positions;

said on-vehicle azimuth modifying means modifies the on-vehicle azimuth by the use of the first and second regression lines; and said on-vehicle position modifying means modifies the on-vehicle position by the use of the first and second regression lines.

10. A vehicle position and azimuth computing apparatus as claimed in claim 1, further comprising:

GPS precision deterioration rate determining means for determining a precision deterioration rate due to a variation of the combination of satellites used in the GPS measurement;

wherein said longitude line computing means and said latitude line computing means obtain said first regression line and said second regression line, respectively, without using the measurement positions obtained by the GPS measurement, when the precision deterioration rate is equal to or higher than a predetermined value;

said on-vehicle azimuth modifying means modifies the on-vehicle azimuth by the use of the first and second regression lines; and said on-vehicle position modifying means modifies the on-vehicle position by the use of the first and second regression lines.

11. A vehicle position and azimuth computing apparatus as claimed in claim 1, wherein, when the GPS measurement positions, which cannot be used in the computation of the first and second regression lines, occur at least a predetermined number of times in succession:

said longitude line computing means and said latitude line computing means obtain said first regression line and said second regression line, respectively, by assuming a measurement position, where the measurement positions have occurred a predetermined number of times in succession, as the straight running starting point;

said on-vehicle azimuth modifying means modifies the on-vehicle azimuth by the use of the first and second regression lines; and said on-vehicle position modifying means modifies the on-vehicle position by the use of the first and second regression lines.

12. A vehicle position and azimuth computing apparatus as claimed in claim 1, wherein said on-vehicle azimuth modifying means is constructed to obtain a first vehicle position based on the longitude and latitude obtained by applying a travel distance, whose value is zero, to the first and second regression lines obtained by the longitude line computing means and the latitude line computing means, respectively, to obtain a second vehicle position based on the longitude and latitude obtained by applying a travel distance of the straight running of the vehicle, from the straight running starting position up to the present vehicle position, to the first and second regression lines; and thereby obtaining an azimuth of the present vehicle position as viewed from the straight running starting position of the vehicle based on the first and second vehicle positions thus obtained.

13. A vehicle position and azimuth computing apparatus as claimed in claim 1, further comprising:

road data gathering means for gathering road data from road map information;

on-vehicle position and azimuth correcting means for comparing, at every predetermined travelling distance, both said on-vehicle position and said azimuth, which have been computed by said on-vehicle position and azimuth computing means, with both an on-road position and an on-road azimuth, which have been gathered by said road data gathering means, respectively, and for making a correction of the on-vehicle position and azimuth by making replacement thereof by the on-road position and azimuth, respectively, when both a positional difference and an azimuth difference therebetween are smaller than respective values which are determined by a moving distance and a rotational angle measured from a vehicle position, where a latest correction has been made, up to the present vehicle position; and correction times recording means for recording the number of times of corrections which have been made within a latest predetermined travelling distance, wherein said on-vehicle position modifying means and said on-vehicle azimuth modifying means are inhibited from performing modifications of the on-vehicle position and the on-vehicle azimuth, respectively, when the number of times of corrections recorded in said correction times recording means is equal to or greater than a predetermined value.

14. A vehicle position and azimuth computing apparatus comprising:

vehicle position and azimuth information gathering means for gathering information on a position and azimuth of a vehicle from outside of the vehicle;

on-vehicle position and azimuth modifying means for modifying the position and azimuth of the vehicle based on the position and azimuth information gathered by said vehicle position and azimuth information gathering means;

road data gathering means for gathering road data from road map information;

on-vehicle position and azimuth correcting means for comparing, at every predetermined travelling distance, both a vehicle position and a vehicle azimuth, which have been gathered by said vehicle position and azimuth information gathering means, with both an on-road position and an on-road azimuth, which have been gathered by said road data gathering means, respectively, and for making a correction of the on-vehicle position and on-vehicle azimuth by making replacement thereof by the on-road position and on-road azimuth, respectively, when both a positional difference and an azimuth difference therebetween are smaller than respective values which are determined by a moving distance and a rotational angle measured from a vehicle position, where a latest correction has been made, up to the present vehicle position; and correction times recording means for recording the number of times of corrections which have been made within a latest predetermined travelling distance, wherein said on-vehicle position and azimuth modifying means is inhibited from performing modifications of the on-vehicle position and the on-vehicle azimuth, respectively, when the number of times of corrections recorded in said correction times recording means is equal to or greater than a predetermined value.

15. A vehicle position an azimuth computing apparatus as claimed in claim 1, wherein said gyro is an optical fiber gyro.

16. A vehicle position an azimuth computing apparatus as claimed in claimed 1, wherein said gyro is a vibration gyro.

* * * * *